ANALOGUE-DIGITAL CONVERTER

Filed Aug. 10, 1951 4 Sheets-Sheet 1

INVENTOR.
ROBERT L. SINK

BY James B. Christie

ATTORNEY

Dec. 25, 1956 R. L. SINK 2,775,754

ANALOGUE-DIGITAL CONVERTER

Filed Aug. 10, 1951 4 Sheets-Sheet 2

INVENTOR.
ROBERT L. SINK

BY James B. Christie

ATTORNEY

INVENTOR.
ROBERT L. SINK
BY James B. Christie
ATTORNEY

INVENTOR.
ROBERT L. SINK
BY James B. Christie
ATTORNEY

United States Patent Office 2,775,754

Patented Dec. 25, 1956

2,775,754

ANALOGUE-DIGITAL CONVERTER

Robert L. Sink, Altadena, Calif., assignor, by mesne assignments, to Consolidated Electrodynamics Corporation, Pasadena, Calif., a corporation of California Application August 10, 1951, Serial No. 241,320

9 Claims. (Cl. 340—347)

This invention relates to the handling of data and more particularly to an analogue-digital converter adapted in various embodiments to convert any analogue type signal of a quasi-static nature into a proportional digital indication or to perform the reverse function of converting a digital value into a proportional analogue value. The term analogue-digital converter as used herein designates an instrument capable either of conversion from analogue to digital values or from digital to analogue values.

There is a great need in the industry for a fast and accurate means of converting analogue signals, i. e. an electrical signal, the voltage of which is proportional to a function being measured, to a digital value. Such a system in its simplest embodiment would provide a data reduction means wherein an analogue voltage would be readable in terms of digits, the digital value being usually readable or available as an electrical signal, usable for recording, calculating or other purposes.

In the usual type of counter presently available for such analogue-to-digital conversion, the lowest digit must proceed through each digit of the total count. Thus, if a counter of this type was capable of response to 8,000 counts a minute, 12½ minutes would be required to reach a value of 100,000. This type of counter requires an excessively long time, and hence is not desirable as an analogue-to-digital converter over a wide dynamic range.

I have now devised a system wherein each of the digits is independently controlled with the result that the digits of each order of magnitude need only go through ten positions, during which period the higher order digits are likewise going through a maximum of ten positions to achieve the largest count. The time advantage of this method is obvious.

The various fields in which the subject system is useful, including simple data recording, record reduction, calculation, and the like, will be discussed in greater detail following the description of the apparatus. The requirements for an ideal digital analogue converter may be partially listed as follows:

1. The accuracy of obtaining data should be 0.1% or better;

2. There should be a digital output with appropriate means included for applying linear, variable or fixed scale factors;

3. The system must be adaptable to work into a recording device for recording the data digitally;

4. There must be adequate stability and reproducibility of information;

5. The apparatus must be trouble-free and easily operated;

6. The response time of the apparatus should be as low as possible. In this regard a response time of from one to five seconds is satisfactory, with a preferred figure being less than two seconds.

In accordance with the invention, and to carry out the objectives stated above, I provide an analogue-digital converter comprising a decade potentiometer, as of the Thompson-Varley type, including a separate section for each significant digit, a separate reversible stepping switch associated with each section of the potentiometer, and means for driving the respective stepping switches responsive to an input signal.

A decade potentiometer within the contemplation of the following disclosure is considered to encompass any potentiometer consisting of two or more interconnected sections in which the output voltage is a decimal fraction of the input voltage. Thompson-Varley and put-an-take potentiometers are well known examples of decade potentiometers.

By means of the separate reversible stepping switches, each section of the potentiometer is independently driven to seek the balanced position. In an analogue-digital converter, in accordance with the invention, a phase sensitive amplifier is connected to each of the stepping switches to compare the voltage of the input signal with that portion of a reference voltage represented by the output of the decade potentiometers. The amplifier, in turn, energizes an appropriate relay to operate the respective stepping switch to drive the tap on the interconnected potentiometer section either upscale or downscale as required. In preferred practice separate phase sensitive amplifiers are associated with each stepping switch with the several amplifiers being increasingly insensitive by a factor of 10 as they determine 1st, 2nd, . . . *n*th order digits.

A feature of the invention which makes it practical to achieve the independent digital sense which characterizes the invention, is the provision of a feed forward connection from the lowest order digit system to the second order digit system and from the second to the third and so on. By this means a signal is fed forward to advise the succeeding system of the correct balance point, as will be explained in the following detailed description.

Although principal interest lies in conversion of analogue-to-digital values, the system of the invention adapts itself with equal facility to conversion of digital signals to analogue signals. Such conversion is sometimes of importance for purposes of calculations where several units of both types are interconnected to solve particular problems.

The invention will be more clearly understood by reference to the following detailed description taken in conjunction with the accompanying drawings, in which.

Figure 1:
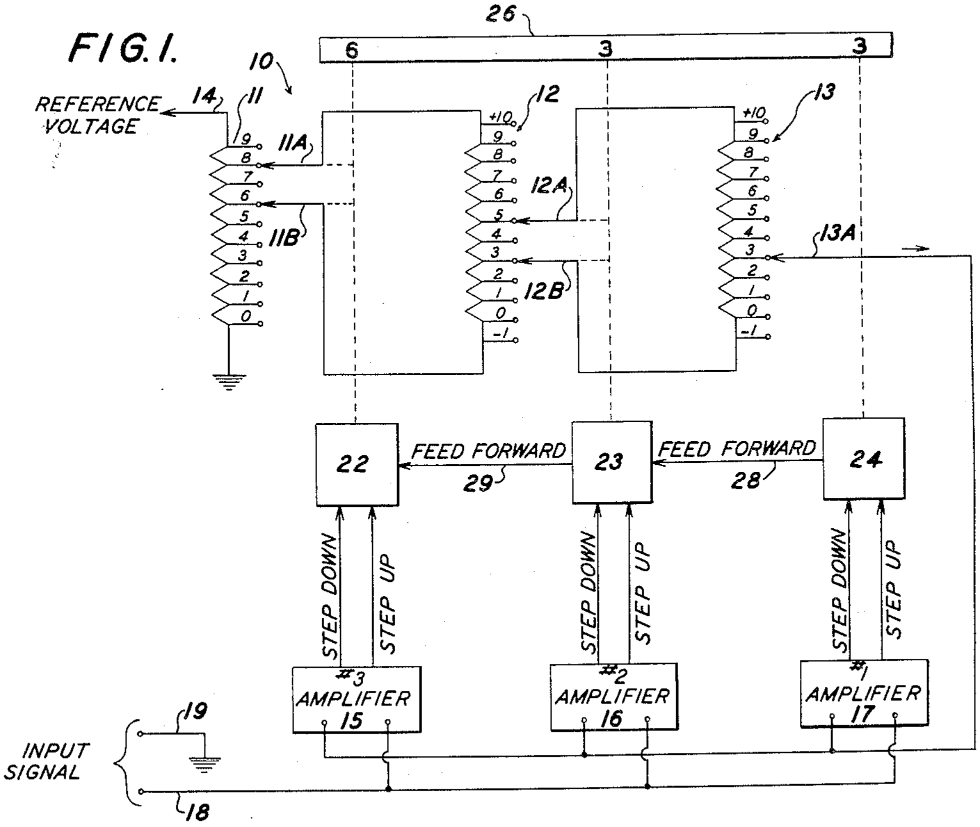
Fig. 1 is a simplified circuit diagram of one embodiment of the invention.

Referring to Fig. 1, the invention in the embodiment there shown comprises a Thompson-Varley type potentiometer 10 having three discrete section windings 11, 12, 13 serially connected through a lead 14 to a reference voltage source (not shown). As conventional in this type of potentiometer, winding 12 is connected at opposite ends through adjustable taps 11A, 11B to spaced points on the winding 11, and winding 13 is connected at opposite ends through adjustable taps 12A and 12B to spaced points on the winding 12. A series of phase sensitive amplifiers 15, 16 and 17 are connected to receive the input signal applied across leads 18, 19, the latter being grounded, and the output signal from the potentiometer winding 13. Reversible stepping switches 22, 23, 24 are connected respectively to the amplifiers 15, 16, 17 and are mechanically linked to the several potentiometer taps to determine the settings thereof. The switch 22 is mechanically connected to operate the taps 11A, 11B of winding 11; switch 23 is connected to position the taps 12A, 12B of winding 12; and switch 24 is similarly connected to position the tap 13A of winding 13. An indicating panel 26, which may consist of lights or numbered wheels or the like, is interconnected with the several stepping switches to indicate the positioning of the respective potentiometer taps. Feed forward connections 28, 29 are provided respectively between the relay 24 and the relay 23 and between the relay 23 and the relay 22.

With the system illustrated in Fig. 1, each digit of a three digit number is separately controlled so that the several digits are balanced independently and need only proceed through a maximum of ten positions to arrive at the desired end figure. When an analogue input signal is applied across the leads 18, 19 the signal is compared in each of the three amplifiers 15, 16 and 17 against the voltage output of the potentiometer. The several phase sensitive amplifiers 15, 16 and 17 successively vary in sensitivity by a factor of about 10. The respective amplifiers operate the associated relays to drive the tap on the respective potentiometer windings either upscale or downscale, depending upon whether or not the potentiometer output voltage is either less than or greater than the input signal.

One of the problems involved in a system of this type, as mentioned above, is that for a given digit the respective amplifier would, under normal conditions, need to be extremely sensitive and stable to insure correct potentiometer balance when the actual voltage is either slightly greater or slightly less than the value required to make the digit step up or down by one unit. This problem is overcome in the present invention by feeding forward through the feed forward leads 28 and 29 a signal which will drive the next higher digit either upscale or downscale depending upon whether or not the next lower order potentiometer section is in the minus one position or in the plus ten position, these positions being respectively indicated on the drawing. In this manner the amplifier requirements with respect to stability of operation are not very severe, since the lower order digital system advises the next higher order system whether or not it should step up or step down one. It is this feed forward feature that makes a system of this type entirely practicable. A more detailed analysis of the system is given with respect to the complete circuit diagram of Fig. 3.

A Thompson-Varley type potentiometer is shown in the embodiment of Fig. 1. A put-take type divider is equally adaptable as is any decade potentiometer. Only three sections adapted to handle three digits are shown, although additional digits may be easily provided for by the incorporation of a suitable number of additional sections. Provision of additional sections requires additional feed forward loops between succeeding sections. The instrument is operable with only a single amplifier located in the lowest order system because the higher order systems can receive the necessary intelligence through the feed forward loops. Preferred construction contemplates separate amplifiers in each digital system, the response time of the instrument being considerably shortened thereby.

The apparatus illustrated in Fig. 1 converts an analogue signal, say from a transducer into a digital form which may be used in several ways. In general the output of the converter may be most useful in the electrical form. In this way, several additional instruments may be utilized either singly or in a parallel coupled system to record the data in useful form.

Figure 2:
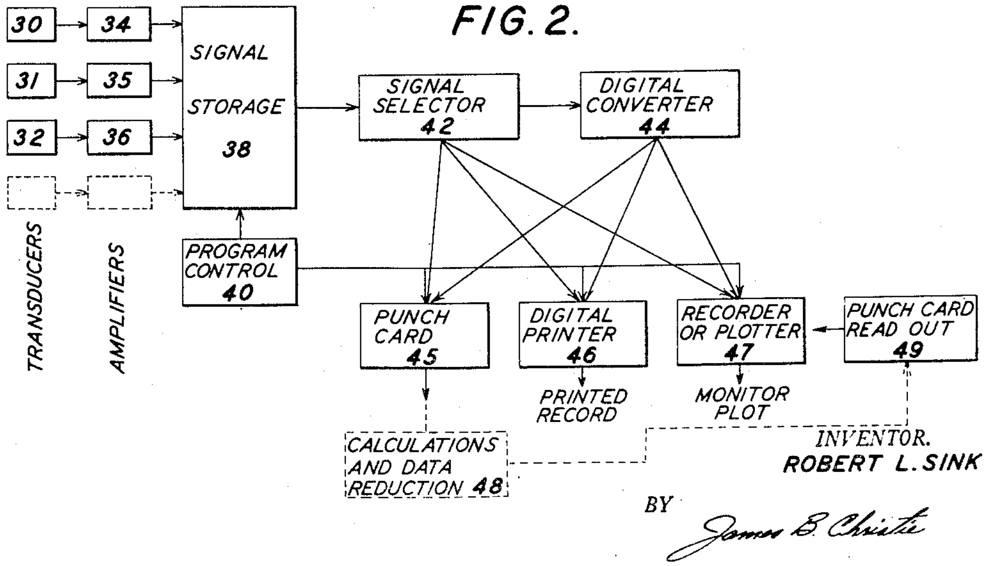
Fig. 2 is a block diagram of a typical data handling system in which the apparatus of Fig. 1 may be employed.

A typical network in which an analogue-digital converter of the type described in Fig. 1 may be used is shown in block diagram in Fig. 2. In the figure there are shown a series of transducers 30, 31 and 32 of the type adapted to deliver an analogue voltage responsive to a condition to be measured. A simple strain gauge would be representative of this type of transducer. The transducers are connected respectively through amplifiers 34, 35, 36 to a signal storage network 38. The signal storage network comprises simply a separate capacitor for each transducer wherein the signals developed in the transducers may be stored to be delivered in a predetermined order as determined by a program control unit 40 to the rest of the system. The program control unit, as the name implies, determines the pattern of operation, and in its simplest aspect is merely a multicontact switch driven either manually or by a timer, or in any prearranged pattern. As determined by the program control unit, stored signals in the signal storage network 38 are applied through a so-called signal selector 42 to a digital converter 44 of the type shown in Fig. 1. The output of the digital converter may be applied to a punch card mechanism 45, a digital printer 46, or a recorder or plotter 47, an impulse being provided at the same time from a signal selector 42 to an appropriate one of these units for channel identification. The punch card unit 45 may deliver appropriately punched cards to a calculation and reduction unit 48 which in turn may feed through a read out unit 49 into the recorder or plotter 47 as an alternative system. A digital printer is a device actuated responsive to the setting of the digital converter and represented schematically only as the member 26 in Fig. 1. A digital recorder or plotter functions as the name implies, such units having been heretofore developed and forming no part of the present invention.

Figure 3:
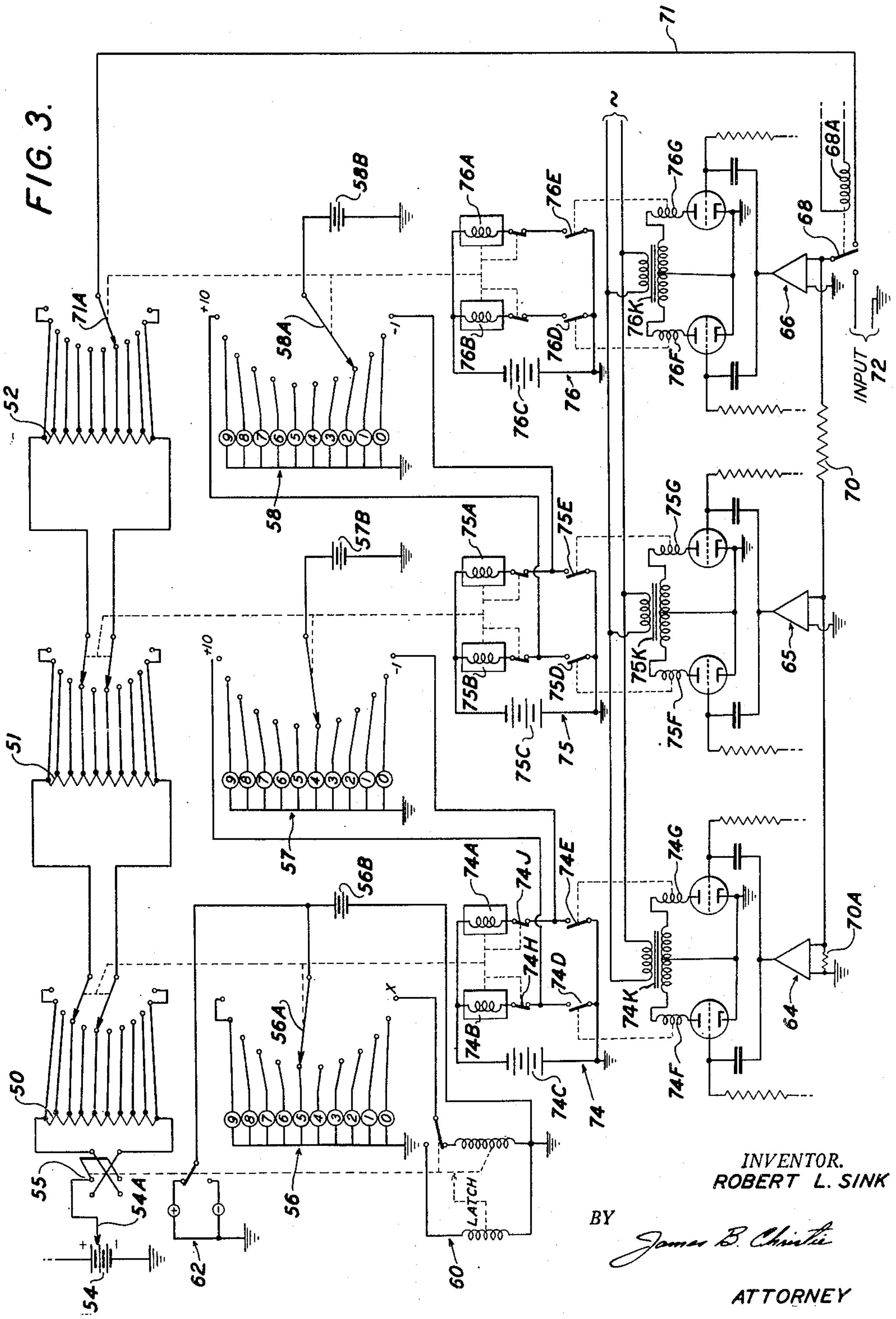
Fig. 3 is a more detailed circuit diagram of an analogue-digital converter of the type shown in Fig. 1.

Fig. 3 is a more detailed circuit diagram of apparatus of the type shown in Fig. 1. In this figure, a decade potentiometer having three sections 50, 51, 52 is connected to a source 54 of reference voltage through a double pole double throw switch 55, the latter being operative in the manner hereinafter described to determine the polarity of the voltage applied to the potentiometer. As in the above described embodiment, each of the sections 51 and 52 are connected at their opposite ends to tapped off points of the sections 50, 51 respectively. The several potentiometer windings have respective indicator banks 56, 57, 58 ganged to the potentiometer taps to indicate position thereof. The indicator bank 58, for example, includes a number of lights indicated as 0, 1, 2, etc., connected in parallel to ground and a switch arm 58A connected to a voltage source 58B. The arm 58A is ganged to the tap of associated potentiometer winding 52 to follow the excursions of that tap lighting at the appropriate one of the several lights in the process. Relays or other indicating means may obviously replace the specific indicator shown.

The indicator bank 56 is similar in having a plurality of lights connected in parallel to ground, a switch arm 56A and a voltage source 56B. This indicator bank has the additional function of controlling the polarity controlling switch 55 and for this purpose is provided with an extra indicating channel labelled X in the drawing connected to a latch type relay 60. As the polarity of the incoming signal reverses, the switch arm 56A will be driven to the contact X to energize the relay 60 which in turn will operate the switch 55 to reverse the polarity of the voltage applied across the potentiometer winding 50. A separate indicating system 62 is simultaneously operated by the relay 60 to give a visual indication of the signal polarity.

Three phase sensitive amplifiers 64, 65, 66 are connected at their inputs to a chopper switch 68, the sensitivity of the three amplifiers being progressively reduced by a factor of 10 by the serial resistors 70, 70A. The switch 68 is connected between input leads 72, and the tap 71A of potentiometer 52 and is driven by coil 68A energized by an A. C. source (not shown). The switch is a part of a conventional chopper network associated with each of the amplifiers 64, 65 and 66 so that the output of each of the amplifiers is a function of the difference, if any, in the voltage appearing at the two sides of the switch 68. Each of the three amplifiers feed into relay networks 74, 75, 76 respectively with each relay network including a step-up coil 74A, 75A, 76A respectively, a step-down coil 74B, 75B, 76B respectively. Step-up step-down coils of each relay are connected respectively across voltage sources 74C, 75C and 76C through switches 74D and 74E, 75D and 75E, 76D and 76E. In each case the appropriate switch is controlled by the phase sensitive output of the respective amplifiers through separate relay coils selectively operated responsive to the phase sensitive output. The relay coils 74F and 74G respectively, control the switches 74D and 74E, the relay coils 75F and 75G, respectively, control the switches 75D and 75E and the relay coils 76F and 76G, respectively, control the switches 76D and 76E. Transformers 74K, 75K and 76K are connected respectively between coils 74F, 74G, coils 75F, 75G, and coils 76F, 76G, the primaries of each of these transformers being connected in parallel to an A. C. source (not shown). By driving the chopper switch 68 and the transformers 74K, 75K, 76K in synchronism, phase sensitivity is achieved whereby one or the other of each of the respectively associated relay coils will be driven as a function of phase as well as unbalance at the chopper switch 68.

Characteristics of step-up step-down relays of this type interrupter switches are included in each to break the circuit with each step of the relay. The relay 74 has interrupter switches 74H and 74J, the relays 75 and 76 having similar interrupter switches.

Feed forward from the lowest order system to the intermediate system and from the intermediate to the highest order system is shown in the drawing. The indicator bank 58 is provided with an extra contact at each end labelled, as in Fig. 1, as a minus one contact and a plus ten contact. The minus one contact is connected to the step-down loop for the succeeding relay 75 and the plus ten contact is connected to the step-up loop of the same relay so that as the indicator arm 58A is driven off scale, either below or above, it will feed a signal forward to the succeeding controlling relay so as to step the relay in the appropriate direction to return the lower order system to an on scale reading. Indicator bank 57 in the intermediate digital system is similarly provided with minus one and plus ten contacts below and above scale, which are respectively connected to the step-down and step-up loops of relay 74 in the highest order system to accomplish the same purpose.

The effect of these feed forward loops is to supply the necessary intelligence to the second and third order systems to properly set these systems when the analogue signal involved is intermediate adjacent settings of the systems. With an analogue input across the lead 72 of say 353 millivolts with the voltage 54A set at 1.0 volt, the lowest order system including the potentiometer winding 52 and the indicator bank 58 will be driven upward towards the plus ten position. At the same time the second order system, including the potentiometer winding 51 and the indicator bank 57, will be driven upscale, and the highest order system, including the potentiometer winding and the indicator bank 56, will be driven upscale at least to the three position. If the sensitivity of the associated amplifier 64 and step-up relay 74 are such as to drive the highest order system to the four position, as might be the case where the voltage to be measured is closer to the four than the three position, the first and second order systems will immediately proceed downscale to the minus one position with the resultant feed forward of a step-down signal to the highest order system returning it to the three position. With the highest order system in the three position, the second order system will step to the five position and in this case will not proceed past the five position because the lowest order value of three is insufficient to drive the second order system to the six position. With the highest order system in the three position and the second order system in the five position, the lowest order system will step to the three position to complete the measurement.

The speed of response of the system will vary slightly with the value to be determined, it being obvious from the foregoing explanation, for example, that a voltage value of 333 would be somewhat more quickly achieved than a value of 393 in that there would be no overdrive of the highest order system, hence saving some of the steps of the lower order systems. However, the over-all response time of the converter does not exceed one second regardless of the value to be measured.

The phase sensitive amplifiers employed in the described system may be any of a number of conventional types. Phases sense is, of course, a necessary requisite to enable the amplifier to actuate the step-up or step-down elements of the system under appropriate circumstances. Most phase sensitive devices involve either a carrier type system or a polarized relay. In general it is desirable to use a carrier type system, at least in the most sensitive decade, since it must respond, for example, to an approximately 10 millivolt signal when the maximum voltage to be handled is 10 volts.

Figure 4:
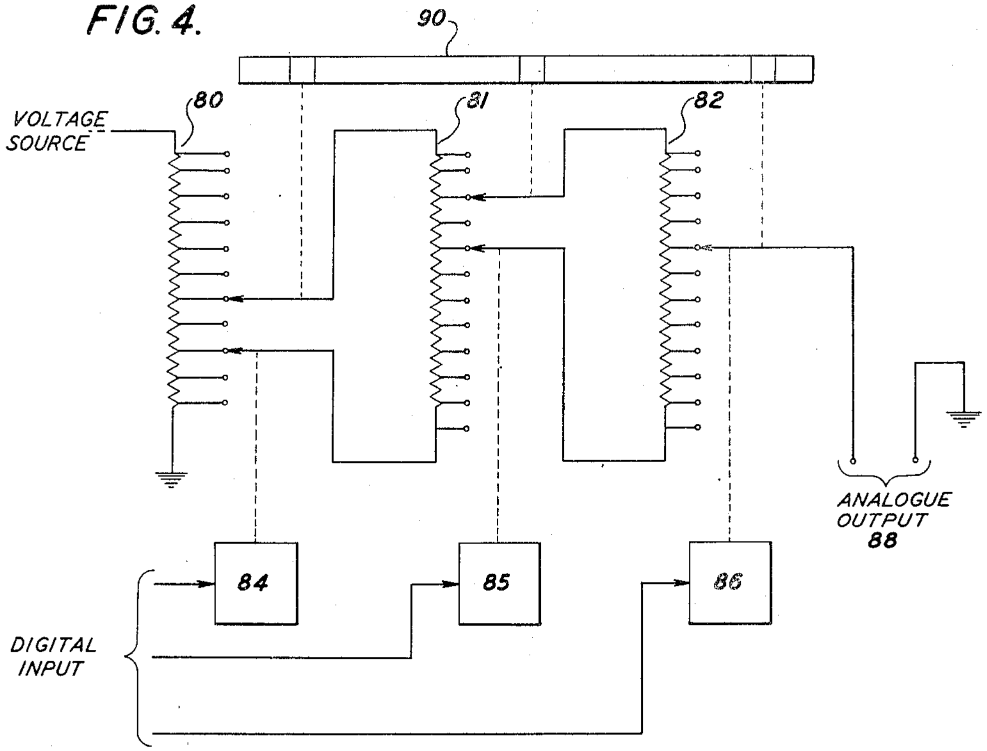
Fig. 4 is a simplified circuit diagram of a digital-to-analogue converter.

Fig. 4 is a circuit diagram of a modification of the apparatus of Fig. 1 wherein a digital input is converted to an analogue output, such a system frequently being useful separately or in conjunction with the analogue-to-digital converter of Fig. 1 in performing various calculative problems. Referring to Fig. 4 the same decade potentiometer including windings 80, 81, 82 connected across a voltage source (not shown), have step-up step-down switches 84, 85, 86, respectively associated therewith. The stepping switches, as in the previous embodiment, are connected to drive the taps of the several potentiometer windings. In this circuit phase sensitive amplifiers are eliminated and a digital input is fed directly to the several relays with a resultant appropriate setting of the taps of the several windings and the delivery at the output 88 of an analogue voltage equivalent to the digital input to the several relays. An indicator bank 90 is represented schematically, as in Fig. 1, and is adapted to reproduce the digital value impressed on the system.

An important feature of the invention lies in the ease with which calibration or correction factors may be applied to the analogue voltage. With equal facility a linear, non-linear or incremental factor may be introduced to the system with a resultant reproduction of the corrected signal, the correction taking place simultaneously with the balancing of the converter. One simple means of applying such a correction factor to the converter system is shown in the circuit diagram of Fig. 5. In this figure the converter consists of the potentiometer 100 connected across the voltage source 101, the taps of the several potentiometer windings being operated through relays 102, 103, 104, the relays being in turn separately actuated by a control amplifier network 106, all as described with relation to Figs. 1 and 3. In this instance a comparison potentiometer 108 is connected across the same voltage source 101 and is tapped to connect with a servo amplifier 109. The output of the potentiometer 100 is fed to a network 110 which constitutes a source of correction voltage. The source 110 is connected through a tap 112 to the input of the control amplifier 106. The signal input lead 114 is connected through control amplifier 106 and also through a by-pass lead 115 into the servo amplifier 109. The output of the servo amplifier is connected to a servomotor 116 which is mechanically connected to drive a cylindrical cam 118 and to control the position of the tap of comparison potentiometer 108.

With this system a correction voltage is placed in series with the input to the converter amplifier. This correction voltage may be conveniently determined by the rectilinear position of the correction cam 118 and by the voltage across the potentiometer 100. Conveniently, a roller 118A riding on the cam 118 is connected to position the input tap 111 to the voltage divider network 110. The input to the servo amplifier 109 is supplied directly from the input signal 114 and is there compared with the output of the comparison potentiometer 108. Any unbalance in these signals appears as an output of the servo amplifier driving the servomotor 116 and the cam 118. Thus the cam position is proportional to the input signals and always has the same physical position for the same input voltage. The correction cam is readily prepared to match the characteristics of any particular transducer system in a manner to add or subtract the voltage necessary to linearize in the entire system.

Figure 5:
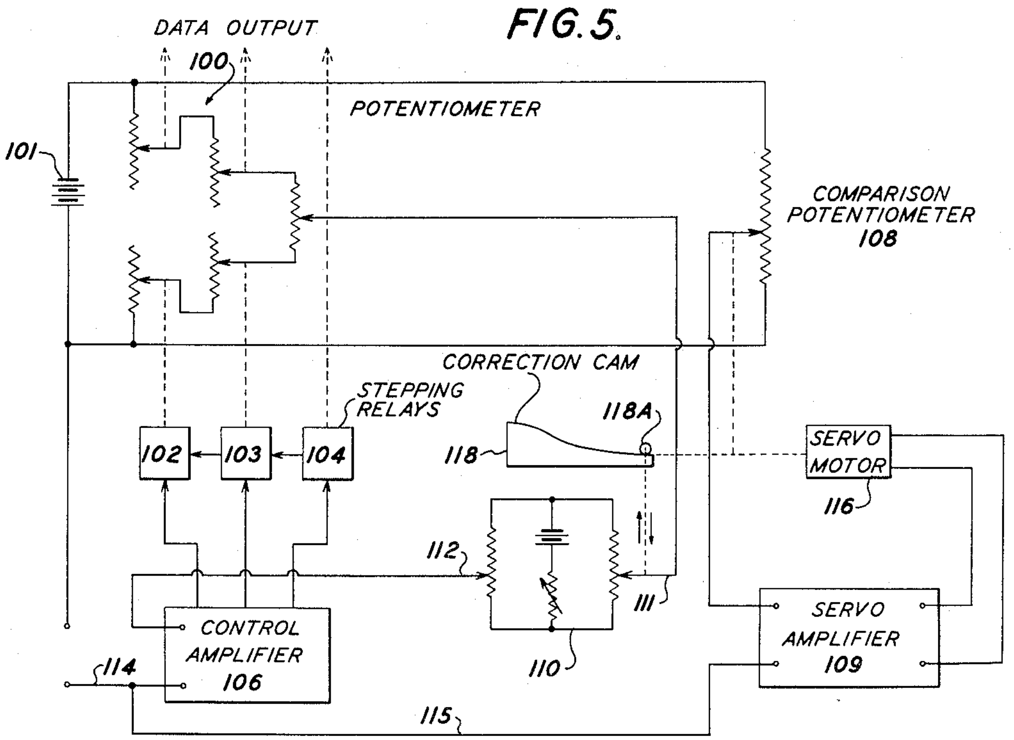
Fig. 5 is a circuit diagram showing the analogue-digital converter provided with means for applying a non-linear correction factor.

The diagram of Fig. 5 is highly simplified but is illustrative of the ease with which correction factor can be applied to the system. With equal facility multiple cams, each with an associated correction potentiometer, may be used on the same cam carriage. Electrical switching can introduce the correct cam and correction potentiometer to match any particular transducer.

It is a simple matter to multiply the analogue voltage by any desired function and to obtain a digital output representative of the multiplied voltage. This is most simply accomplished by varying the source voltage. With reference to Fig. 3, for example, the tap 54A connecting the potentiometer network with the voltage source 54 may be varied upscale or downscale to increase or decrease the magnitude of the voltage applied across the potentiometer network and to thus multiply the analogue input by a corresponding factor. In this manner multiplication and division can be carried out in the converter by a variation of the reference voltage on the self-balancing potentiometer system. For example, a three-volt input signal may normally result in a count of 300 on the digital output. However, the reference voltage and amplifier gain can be varied so that the digital output can be any number between 100 and 1000 for the three-volt input signal. If additional channels are provided in the converter, it being obvious that five digits may be obtained in the same fashion as three digits as illustrated, the limits within which multiplication or division may be carried out are correspondingly expanded. Multiplication by a constant function is accomplished through a single change in the reference voltage. The multiplication of two variables can be achieved by allowing the analogue output of a converter of the type shown in Fig. 4 to control the reference voltage of an analogue-digital converter of the type shown in Fig. 1.

Scale factors can likewise be introduced by merely adjusting the output of the converter to read some function other than the normal voltage. By way of example, if 100 pounds per square inch on a transducer results in a normal digital output of 179, the control may be so adjusted that the output is instead 100 and the output is then calibrated in pounds per square inch.

Non-linear scale factors can be introduced in the manner shown in Fig. 5. Addition or subtraction of two quantities may be carried out with a number of converters. Digital values are impressed on separate digital-to-analogue converters of the type shown in Fig. 4, and the analogue output of the two are used as the input to an analogue digital converter as shown in Figs. 1 and 3. Alternatively, a single converter can be used for the same purpose by storing determinate values until required. This alternative procedure is more time consuming than the procedure involving a series of converters.

Figure 6:
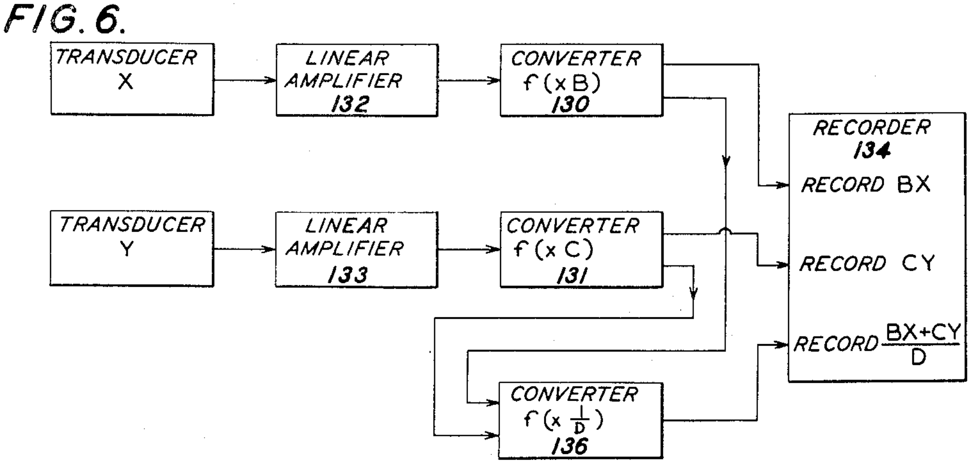
Fig. 6 is a block diagram of a system wherein a number of converters in accordance with the invention may be employed to perform simple calculations.

It is easy to postulate almost any number of possible combinations for carrying out particular calculations. One such sample combination is shown by way of illustration in the block diagram of Fig. 6 in which two converters 130, 131 are connected respectively to transducer X and transducer Y through linear amplifiers 132 and 133. With the converter 130 having its reference voltage source at a value B, the output thereof will record the product BX on a recorder 134. With the source voltage of the converter 131 at a value C the output thereof will record the product CY on the recorder 134. By feeding the output of the converters 130 and 131 into a third converter 136, the source function of which is set at 1/D, there is recorded the function $(BX+CY)/D$ as an output of the converter 136. This represents a simple system for elementary calculations. There is substantially no limit to the variations and combinations which may be postulated to carry on basic mathematical calculations.

The converter herein described is, by way of summary, essentially a self-balancing potentiometer. The input voltage is compared to the voltage on the potentiometer as through the action of a synchronous converter or chopper as a component of the phase sensitive amplifier. Through the servo action achieved in the stepping switches, the output voltage of the potentiometer is adjusted to equal that of the input voltage. The fundamental difference in the operation of the herein described converter over that of other self-balancing potentiometers is that the balancing function is carried on through the action of stepping relays rather than the more common slidewire and servomotor. This balancing technique results in a discrete and highly accurate balancing point for a high speed of operation. The digital conversion is provided through the relay contacts as only one set of contacts per decimal digit can be closed at any one time. The fact that the output signal is a closed contact allows almost unlimited control of power without loss of signal accuracy.

In its principal form the converter will accept an analogue input signal and produce an output signal, but the design of the instrument is such that it can also accept digital input signals to produce analogue output signals with the result, above mentioned, that the several converters may be combined to arrive at any of a number of complex functions of the original input signals.

Once the positive digital output signal has been achieved the unit can operate any other device, such as punch card apparatus, printing mechanisms or the like designed to accept digital input information. As mentioned above, one of the prime features of the converter which contributes to its high speed of response and accuracy is the feed forward of intelligence from a lower order digit channel to a higher order digit channel to aid the latter in arriving at the balance position. Because of this feed forward provision it is unnecessary that the sensitivity of the higher order channels be sufficiently precise to distinguish between fractional increments. This is of major importance in avoiding an otherwise existing tendency to hunt when a value to be recorded lies close to the midway point between adjacent digits.

I claim:

1. An analogue-digital converter comprising a decade potentiometer including a separate section for each digital order, a voltage source connected across the potentiometer, a separate reversible stepping switch connected to each section of the potentiometer to determine the setting of the respective section, a separate pair of relays connected respectively to control the upscale and downscale movement of each stepping switch, a separate phase sensitive amplifier connected to energize each of said pair of relays, the several amplifiers progressively differing in sensitivity by a factor of about 10, means for comparing an input voltage signal with the output of the potentiometer and for feeding the algebraic sum of said signals to the several amplifiers, feed forward connections between succeeding stepping switches from the lowest to the highest order to drive such succeeding switches in appropriate direction when the potentiometer section controlled by the preceding switch is driven off scale and as long as said section remains off scale, means for indicating the settings of the several potentiometer sections, and switch means connected to be actuated responsive to movement of the highest order stepping switch off scale in the lowest position to reverse the polarity of the voltage source.

2. An analogue-digital converter comprising a decade potentiometer including a separate section for each digital order, a separate reversible drive means connected to each section of the potentiometer to control the setting of the respective section, a separate phase sensitive amplifier connected to energize each of said reversible drive means, the several amplifiers progressively differing in sensitivity by a factor of about 10, an auxiliary adjustable voltage source, and means for comparing an input voltage signal, the output of the potentiometer and a predetermined auxiliary voltage from said auxiliary source and for feeding the algebraic sum of said signals to the phase sensitive amplifiers.

3. An analogue-digital converter comprising a decade potentiometer including a separate section for each digital order, a variable voltage source connected across the potentiometer, a separate reversible drive means connected to each section, a separate phase sensitive amplifier connected to energize each of said drive means, the several amplifiers progressively differing in sensitivity by a factor of about 10, means connecting the output of said potentiometer to the several amplifiers, a variable auxiliary voltage source connected in parallel between the output of the potentiometer and the several amplifiers, means for feeding an unknown voltage signal to the several amplifiers, and means for varying the voltage contribution of said auxiliary source.

4. Apparatus according to claim 3 wherein the means for varying the voltage contribution of said auxiliary source comprises a servo amplifier connected to compare the unknown input voltage with a known fraction of the potentiometer voltage, a servomotor operable responsive to the output of said servo amplifier, a cam driven by said servomotor and means for varying said voltage contribution in accordance with the configuration of the cam.

5. An analogue-digital converter comprising a decade potentiometer including a separate section for each digital order, a variable voltage source connected across the potentiometer, a separate reversible drive means connected to each section, means energizing said drive means responsive and in proportion to the algebraic sum of the output of said potentiometer and an input voltage signal and means for varying the voltage connected across the potentiometer.

6. An analogue-digital converter comprising a decade potentiometer including a separate section for each digital order, a separate reversible stepping switch connected to each section of the potentiometer to determine the setting of the respective section, a separate pair of relays connected respectively to control the upscale and downscale movement of each stepping switch, a separate phase sensitive amplifier connected to energize each of said pair of relays, the several amplifiers progressively differing in sensitivity by a factor of about 10, means for adding a variable voltage to the output of said potentiometer, means for comparing an unknown input voltage signal with the output of the potentiometer as modified by said variable voltage and for feeding the algebraic sum of said signals to the several amplifiers, feed forward connections between succeeding stepping switches from the lowest to the highest order to drive such succeeding switches in appropriate direction when the potentiometer section controlled by the preceding switch is driven off scale and as long as said section remains off scale, and means for indicating the setting of the several potentiometer sections.

7. In a calculator, the combination comprising at least one analogue-digital converter connected to receive an unknown analogue signal and to indicate a given function ($f_1$) of the digital value thereof and at least one additional analogue digital converter connected to receive the output of the first converter and to indicate a given function ($f_2$) thereof wherein each converter comprises a decade potentiometer, separate drive means associated with each section of the potentiometer, and means separately energizing the separate drive means responsive to the magnitude and phase of an input signal.

8. An analogue-digital converter comprising a decade potentiometer including a separate section for each digital order, a voltage source connected in shunt across the most significant section of the potentiometer, separate reversible stepping switches connected to each section of the potentiometer to determine the setting of the respective section, phase-sensitive amplifier means coupled to the stepping switches for controlling the upscale and downscale movement of each stepping switch, a pair of feed forward connections coupled between successive stepping switches from the lowest to the highest order for driving the higher order stepping switches upscale or downscale when the next successive stepping switch is driven off scale in the upscale or the downscale directions, and means for comparing an input voltage signal with the output of the least significant section of the potentiometer and for feeding the algebraic sum of these voltages to the amplifier means to balance the potentiometer and cause the voltage of the input signal to be equal to the voltage at the output of the potentiometer.

9. An analogue-digital converter comprising a decade potentiometer including a separate section for each digital order, a voltage source connected in shunt across the most significant section of the potentiometer, separate reversible stepping switches connected to each section of the potentiometer to determine the setting of the respective section, phase-sensitive amplifier means coupled to the stepping switches for controlling the upscale and downscale movement of each stepping switch, feed forward connections coupled between successive stepping switches from the lowest to the highest order for driving the higher order stepping switches upscale or downscale when the next successive stepping switch is driven off scale in the upscale or the downscale directions, and means for combining an input voltage signal with the output of the least significant section of the potentiometer and for feeding the combined voltages to the amplifier means to balance the potentiometer and cause the voltage at the output of the potentiometer to have a predetermined relationship with respect to the voltage of the input signal.

References Cited in the file of this patent

UNITED STATES PATENTS

| | | |
|---|---|---|
| 1,626,560 | Schneider | Apr. 26, 1927 |
| 2,108,146 | Simpson | Feb. 15, 1938 |
| 2,123,142 | McMaster | July 5, 1938 |
| 2,271,508 | Gordon | Jan. 27, 1942 |
| 2,538,826 | Avery | Jan. 23, 1951 |
| 2,537,498 | Wickesser | Jan. 9, 1951 |
| 2,625,587 | Kempf | Jan. 13, 1953 |
| 2,625,822 | Nichols | Jan. 20, 1953 |

FOREIGN PATENTS

| | | |
|---|---|---|
| 266,798 | Great Britain | Feb. 28, 1927 |